United States Patent
Liu et al.

(10) Patent No.: US 7,221,087 B2
(45) Date of Patent: May 22, 2007

(54) CARBON NANOTUBE-BASED FIELD EMISSION DISPLAY

(75) Inventors: Liang Liu, Beijing (CN); Shoushan Fan, Beijing (CN)

(73) Assignees: Tsinghua University, Beijing (CN); Hon Hai Precision Ind. Co., Ltd., Tu-Cheng (TW)

( * ) Notice: Subject to any disclaimer, the term of this patent is extended or adjusted under 35 U.S.C. 154(b) by 295 days.

(21) Appl. No.: 10/811,444

(22) Filed: Mar. 26, 2004

(65) Prior Publication Data
US 2004/0189182 A1 Sep. 30, 2004

(30) Foreign Application Priority Data
Mar. 26, 2003 (CN) ................. 03 1 14069

(51) Int. Cl.
*H01J 19/24* (2006.01)
(52) U.S. Cl. ............... 313/497; 313/309; 313/336; 313/351; 313/311
(58) Field of Classification Search ......... 313/309, 313/336, 351, 495, 497, 292
See application file for complete search history.

(56) References Cited

U.S. PATENT DOCUMENTS

| | | | |
|---|---|---|---|
| 6,339,281 B2 | 1/2002 | Lee et al. | |
| 6,436,221 B1 | 8/2002 | Chang et al. | |
| 6,440,761 B1 * | 8/2002 | Choi | 438/20 |
| 6,472,802 B1 * | 10/2002 | Choi et al. | 313/309 |
| 6,515,415 B1 | 2/2003 | Han et al. | |
| 6,650,061 B1 * | 11/2003 | Urayama et al. | 315/169.3 |
| 6,812,480 B2 * | 11/2004 | Lee et al. | 257/10 |
| 6,911,767 B2 * | 6/2005 | Takai | 313/311 |

\* cited by examiner

*Primary Examiner*—Ashok Patel
(74) *Attorney, Agent, or Firm*—Wei Te Chung

(57) ABSTRACT

A field emission display includes: a cathode electrode (17); an anode electrode (20); a gate electrode (19) arranged between the cathode electrode and the anode electrode; a carbon nanotube array (15) electrically connected to the cathode electrode at a first end; and a spacer (14) insulatively separating the gate electrode from the cathode electrode. A second opposite end of the carbon nanotube array is flush with a top end of the spacer. An intermediate layer (11) having a precisely controllable thickness is arranged between the gate electrode and the spacer. The distance between the gate electrode and the carbon nanotube array is mainly controlled by the thickness of the intermediate layer.

22 Claims, 5 Drawing Sheets

CARBON NANOTUBE-BASED FIELD EMISSION DISPLAY

BACKGROUND OF THE INVENTION

1. Field of the Invention

The present invention relates to field emission displays, and particularly to a carbon nanotube-based field emission display.

2. Description of Related Art

Carbon nanotubes are very small tube-shaped structures having the composition of a graphite sheet rolled into a tube. Carbon nanotubes produced by arc discharge between graphite rods were first discovered and reported in an article by Sumio Iijima entitled "Helical Microtubules of Graphitic Carbon" (Nature, Vol. 354, Nov. 7, 1991, pp. 56-58). Carbon nanotubes are electrically conductive along their length, are chemically stable, and can have very small diameters (much less than 100 nanometers) and large aspect ratios (length/diameter). Due to these and other properties, it has been suggested that carbon nanotubes can play an important role in field emission display devices.

Referring to FIG. 14, U.S. Pat. No. 6,339,281 discloses a method for making a triode-structure carbon nanotube-based field emission display. The method comprises the steps of:

(1) forming a cathode electrode 2, a gate insulation layer 3 and a gate electrode 4 in sequence on a glass substrate 1;
(2) forming a gate opening (not labeled) in the gate electrode 4;
(3) forming a micro-cavity (not labeled) in the gate insulation layer 3;
(4) forming a separation layer 7 on the gate electrode 4 and forming a base layer 8 and 8' on the separation layer 7;
(5) forming a catalyst layer 9 and 9' on the base layer 8 and 8'; and
(6) forming a non-reactive layer 5 on the catalyst layer 9' outside the micro-cavity; and growing carbon nanotubes 6 on the catalyst layer 9 within the micro-cavity by chemical vapor deposition.

However, in practice, there are the following persistent problems in fabricating carbon nanotube-based field emission displays by chemical vapor deposition:

1. In order to achieve a uniform illuminance, a distance between gate electrodes and carbon nanotubes should be kept uniformly constant over a large display area. However, it is difficult to assure desired uniformity of heights of the carbon nanotubes over a large area by chemical vapor deposition.
2. In order to lower a threshold voltage of the gate electrodes, the distance between the gate electrodes and the carbon nanotubes should be as little as possible. However, it is difficult to precisely control a height of the carbon nanotubes to a micro-scale level by chemical vapor deposition.
3. A carbon nanotube array formed by chemical vapor deposition invariably contains a layer of randomly distributed carbon nanotubes, catalyst particles and tiny amount of amorphous carbon, which impair field emission performance of the carbon nanotube arrays and reduce the field emission display's product life cycle.

SUMMARY OF THE INVENTION

Accordingly, an object of the present invention is to provide a field emission display which maintains a uniformly constant distance between gate electrodes and carbon nanotube emitters over a large display area.

Another object of the present invention is to provide a field emission display having a precisely controllable distance between the gate electrodes and the carbon nanotube emitters.

In order to achieve the objects set above, a carbon nanotube-based field emission display in accordance with a preferred embodiment of the present invention comprises: a cathode electrode; an anode electrode; a gate electrode arranged between the cathode electrode and the anode electrode; a carbon nanotube array electrically connected to the cathode electrode at a first end; and a spacer insulatively separating the gate electrode from the cathode electrode. A second opposite end of the carbon nanotube array is flush with a top end of the spacer nearest the gate electrode. An intermediate layer having a precisely controllable thickness is arranged between the gate electrode and the spacer. The distance between the gate electrode and the carbon nanotube array is mainly controlled by the thickness of the intermediate layer.

These and other features, aspects and advantages of the invention will become more apparent from the following detailed description, claims and the accompanying drawings, in which:

DETAILED DESCRIPTION OF THE PRESENT INVENTION

Reference will now be made to the drawings to describe the preferred embodiment of the present invention in detail.

Figure 13:
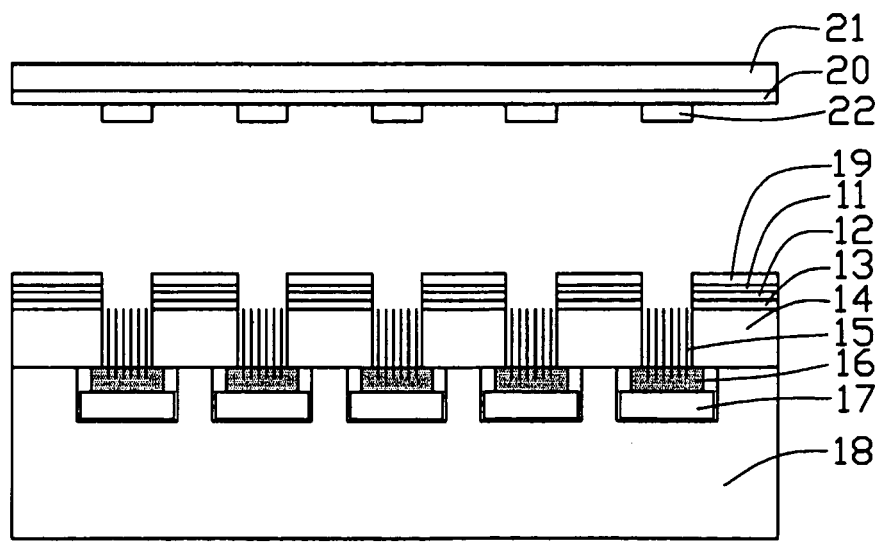
FIG. 13 is a similar to FIG. 12, but showing the subassembly thereof assembled with a display screen, thereby obtaining the field emission display of the present invention.
Figure 14:
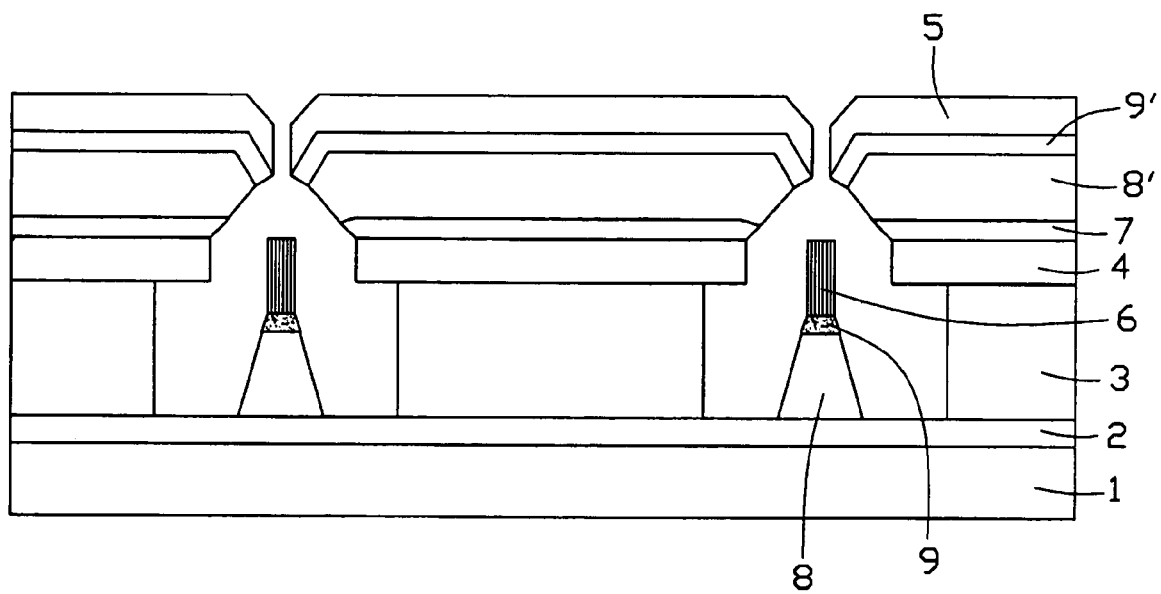
FIG. 14 is a conventional triode-structure carbon nanotube field emitter array.

Referring initially to FIG. 13, a field emission display in accordance with the present invention comprises: cathode electrodes 17, an anode electrode 20, gate electrodes 19 arranged between the cathode electrodes 17 and the anode electrode 20, carbon nanotube arrays 15, and a spacer 14. A layer of negative feedback resistance 16 is formed between first ends of the carbon nanotube arrays 15 and the cathode electrodes 17. Opposite second ends of the carbon nanotube arrays 15 are flush with corresponding ends of the spacer 14 that are nearest the gate electrodes 19. The cathode electrodes 17 are packaged with a bottom cover 18.

Figure 1:
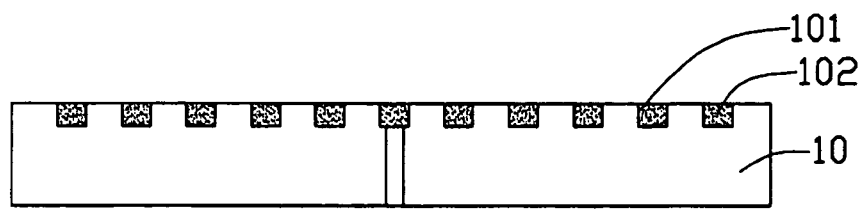
FIG. 1 is a schematic side elevation view of a detachable substrate used in making a field emission display in accordance with the present invention.

A method for making the field emission display is as follows. Referring to FIG. 1, a detachable substrate 10 having a flat surface (not labeled) is first provided. Preferably, a plurality of grooves or apertures 101 is defined in the surface of the substrate 10, for facilitating removal of the substrate 10 in a later step. The surface is preferably coated with a removable material such as wax 102, so as to achieve a variation in flatness of the surface of less than 1 micron. The substrate 10 is generally made of refractory material, which is capable of resisting high temperatures.

Figure 2:
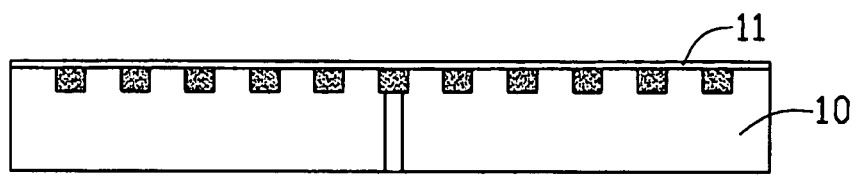
FIG. 2 is similar to FIG. 1, but showing an intermediate layer formed on the detachable substrate.

Referring to FIG. 2, an intermediate layer 11 is formed on the surface of the substrate 10 by a coating or printing process. The intermediate layer 11 may alternatively be substituted by provision of a thin plate. The intermediate layer 11 is for controlling a distance between the carbon nanotube arrays 15 and the gate electrodes 19, and is also used as a substrate for growing of the carbon nanotube arrays 15 in the later step. A thickness of the intermediate layer 11 is in the range from 1 micron to 1000 microns, and preferably in the range from 10 microns to 200 microns. A variation in flatness of the intermediate layer 11 is preferably controlled to be less than 1 micron. The intermediate layer 11 is generally made of material which is capable of being processed by photolithography and enduring temperatures of about 700° C. Accordingly, the intermediate layer 11 generally comprises material selected from the group consisting of heatproof glass, metal coated with insulating material, silicon, silicon oxide, mica and ceramic material.

Figure 3:
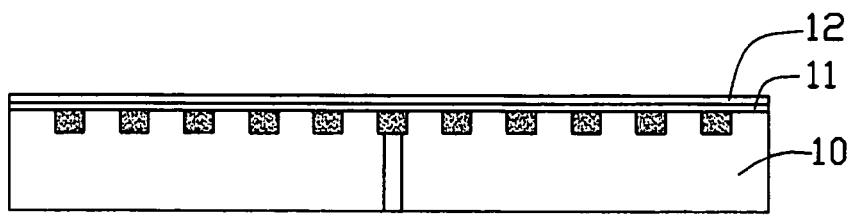
FIG. 3 is similar to FIG. 2, but showing a protective layer formed on the intermediate layer.

Referring to FIG. 3, a protective layer 12 is deposited on the intermediate layer 11 by e-beam evaporation or magnetron sputtering. The protective layer 12 is for protecting carbon nanotube arrays 15 from being damaged or destroyed during a later step of wet etching. Preferably, the protective layer 12 is made of silicon. Alternatively, the protective layer 12 can be made of another suitable material which is capable of withstanding a wet etching process, and yet which is removable by a dry etching process. The protective layer 12 is as thin as possible, and preferably in the range from 10 nm to 1 micron. It should be noted that deposition of the protective layer 12 is not an essential step in practicing the present invention.

Figure 4:
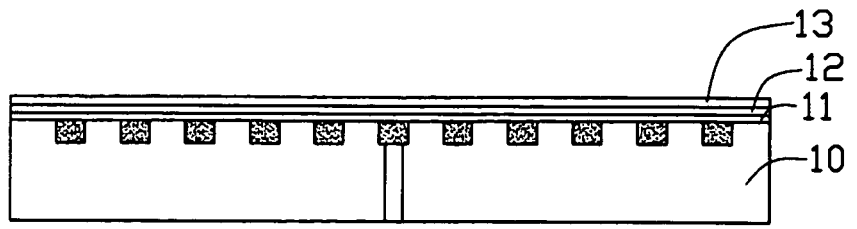
FIG. 4 is similar to FIG. 3, but showing a catalyst layer formed on the protective layer.

Referring to FIG. 4, preferably, a catalyst layer 13 is deposited on the protective layer 12 by e-beam evaporation, thermal evaporation or sputtering. The catalyst layer 13 can generally be iron, cobalt, nickel, or any suitable combination alloy thereof. A thickness of the catalyst layer 13 is in the range from 1 nm to 10 nm, and preferably about 5 nm.

Figure 5:
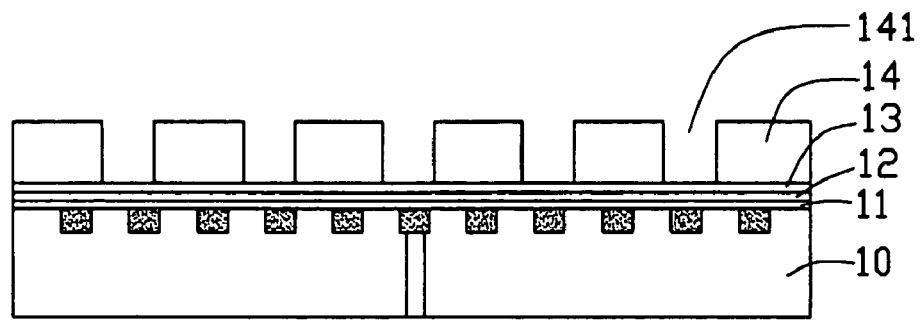
FIG. 5 is similar to FIG. 4, but showing a spacer formed on the catalyst layer.

Referring to FIG. 5, a spacer 14 is formed on the catalyst layer 13 by coating or printing, in a configuration corresponding to the pattern of the gate electrodes 19. The spacer 14 is for insulating the gate electrodes 19 from the cathode electrodes 17, and for defining spaces 141 for growing the carbon nanotube arrays 15. The spacer 14 may alternatively be substituted by provision of a thin plate with spaces defined therethrough. A surface of the thin plate, which is attached to the catalyst layer 13, preferably has a variation in flatness of less than 1 micron. A thickness of the spacer 14 is related to and determined by heights of the carbon nanotube arrays 15. Generally, the thickness of the spacer 14 is in the range from 1 micron to 10 mm, and preferably in the range from 10 microns to 500 microns. The spacer 14 is made of material which is capable of enduring temperatures of about 700 degree. Accordingly, the spacer 14 generally comprises material selected from the group consisting of heatproof glass, metal coated with insulating material, silicon, silicon oxide, mica and ceramic material.

Figure 6:
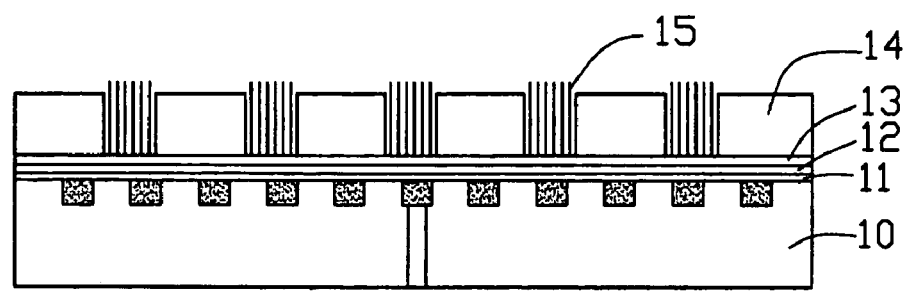
FIG. 6 is similar to FIG. 5, but showing carbon nanotube arrays formed on the catalyst layer of FIG. 5.

Referring to FIG. 6, the carbon nanotube arrays 15 are formed within the spaces 141 defined by the spacer 14 by conventional chemical vapor deposition. The heights of the carbon nanotube arrays 15 are controlled to be approximately equal to the thickness of the spacer 14.

Figure 7:
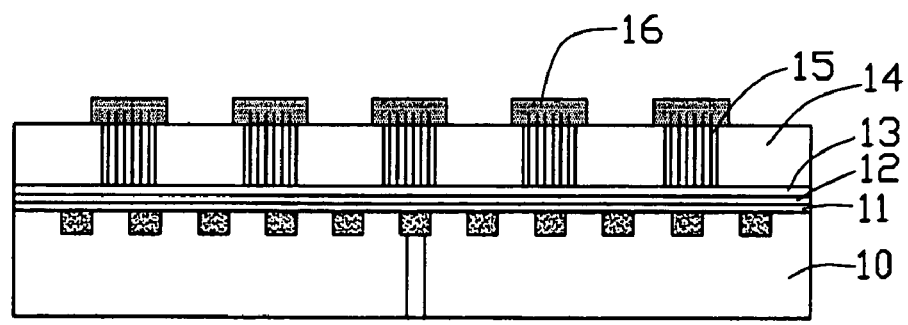
FIG. 7 is similar to FIG. 6, but showing a layer of negative feedback resistance formed on tops of the carbon nanotube arrays.

Referring to FIG. 7, a layer of negative feedback resistance 16 is then formed for the purposes of associated driving circuits. The layer of negative feedback resistance 16 is generally deposited on the carbon nanotube arrays 15 by e-beam evaporation, thermal evaporation or sputtering. The layer of negative feedback resistance 16 can be made of silicon or a metallic alloy.

Figure 8:
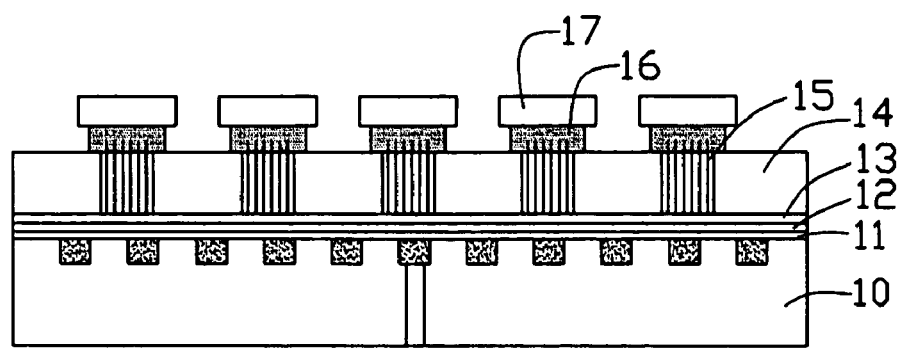
FIG. 8 is similar to FIG. 7, but showing cathode electrodes formed on the layer of negative feedback resistance.

Referring to FIG. 8, cathode electrodes 17 are formed on the layer of negative feedback resistance 16. The cathode electrodes 17 can be formed by e-beam evaporation, thermal evaporation or sputtering. The cathode electrodes 17 can be made of metallic material. A coefficient of thermal expansion of the metallic material is preferably compatible with those of the bottom cover 18 and the layer of negative feedback resistance 16.

Figure 9:
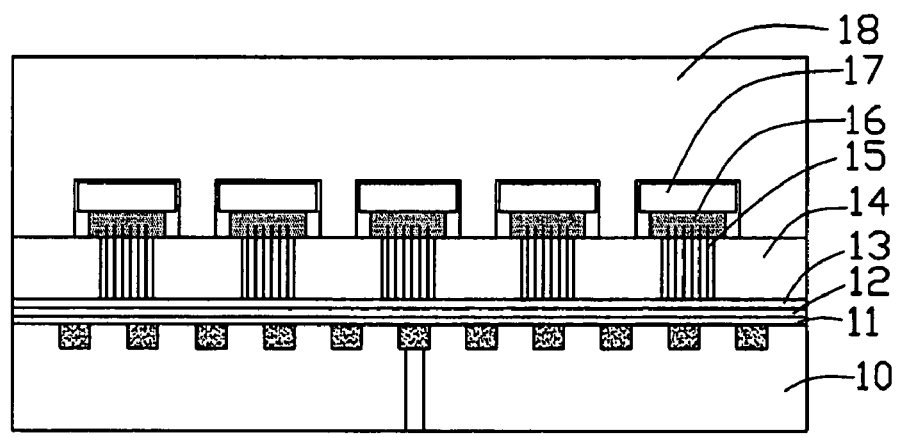
FIG. 9 is similar to FIG. 8, but showing the cathode electrodes packaged with a cover.

Referring to FIG. 9, the cathode electrodes 17 are packaged with a bottom cover 18 by printing, fusion or a suitable bonding method. The bottom cover 18 can be made of glass, plastic or ceramic material.

Figure 10:
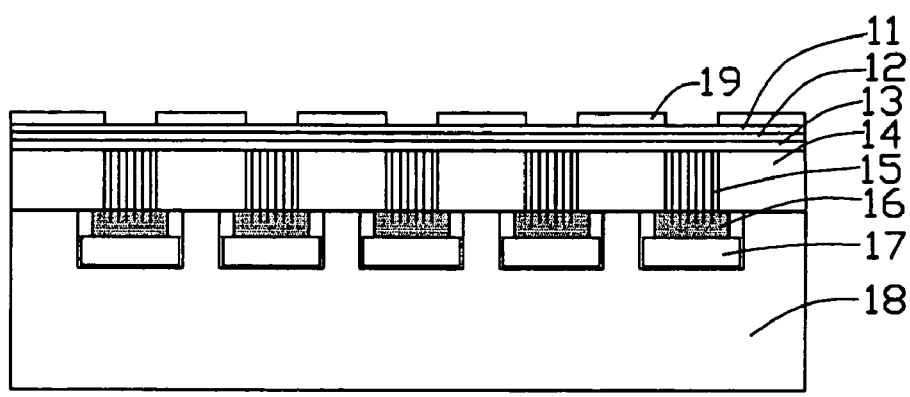
FIG. 10 is similar to FIG. 9, but showing the subassembly thereof inverted, with the detachable substrate removed, and gate electrodes formed on the intermediate layer.

Referring to FIG. 10, the substrate 10 is removed, and the remaining subassembly is inverted. Gate electrodes 19 are deposited on the intermediate layer 11 at locations offset in relation to the carbon nanotube arrays 15, by way of e-beam evaporation, thermal evaporation or sputtering. The gate electrodes 19 can be made of the same material as the cathode electrodes 17.

Figure 11:
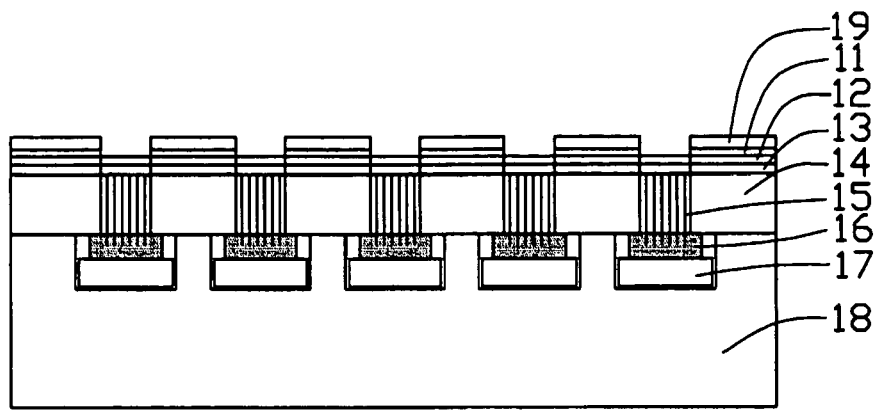
FIG. 11 is similar to FIG. 10, but showing unwanted portions of the intermediate layer removed.

Referring to FIG. 11, portions of the intermediate layer 11 are removed by a wet etching process. Said portions correspond to positions of the carbon nanotube arrays 15.

Figure 12:
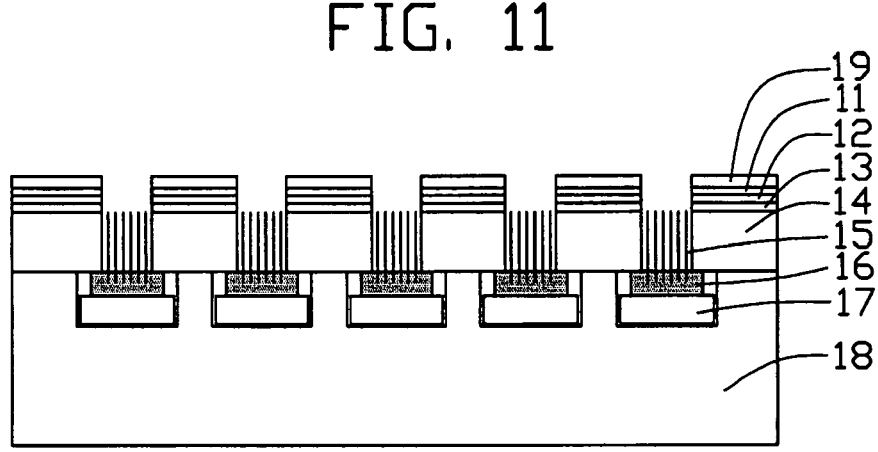
FIG. 12 is similar to FIG. 11, but showing unwanted portions of the protective layer and remaining catalyst layer removed.

Referring to FIG. 12, portions of the protective layer 12 are removed by a dry etching process. Said portions correspond to the positions of the carbon nanotube arrays 15. If necessary, a laser is applied to remove corresponding portions of the catalyst layer 13, in order to expose the second ends of the carbon nanotube arrays 15 to the gate electrodes 19.

Referring to FIG. 13, a display screen is provided. The display screen comprises a glass substrate 21 with the anode electrode 20 formed thereon, and phosphor layers 22 formed on the anode electrode 20. The display screen is attached to the subassembly obtained in FIG. 12.

While the present invention has been described with reference to a particular embodiment, the description is illustrative of the invention and is not to be construed as limiting the invention. Therefore, various modifications to the present invention can be made to the described embodiment by those skilled in the art without departing from the true spirit and scope of the invention as defined by the appended claims.

What is claimed is:

1. A field emission display comprising:
   at least a cathode electrode;
   at least a carbon nanotube array having a first end surface adapted for emission of electrons therefrom and a second end surface in electrical connection with a corresponding cathode electrode;
   an anode electrode;

at least a gate electrode arranged between the at least a cathode electrode and the anode electrode;

a spacer adapted for insulating the at least a cathode electrode and the at least a gate electrode, the second end surface of the carbon nanotube array being substantially flush with an end of the spacer;

a catalyst layer arranged adjacent to the spacer, the catalyst layer being located on a side of the spacer opposite the cathode; and an intermediate layer arranged between the gate electrode and the catalyst layer.

2. The filed emission display as described in claim 1, wherein a material of the spacer is selected from the group consisting of heatproof glass, metal coated with insulating material, silicon, silicon oxide, mica and ceramic material.

3. The field emission display as described in claim 2, wherein a height of the spacer is in the range from 1 micron to 10 mm.

4. The field emission display as described in claim 1, wherein each carbon nanotube array is connected to the corresponding cathode electrode via a layer of negative feedback resistance, which is formed between the carbon nanotube array and the cathode electrode.

5. The field emission display as described in claim 1, wherein a thickness of the intermediate layer is in the range from 1 micron to 1000 microns.

6. A field emission display comprising:
at least a cathode electrode;
an anode electrode;
at least a gate electrode arranged between the cathode electrodes and the anode electrode;
at least a carbon nanotube array, each array having a first array end and a second array end, each first array end being electrically connected to a corresponding cathode electrode;
a spacer insulatively separating the gate electrodes from the cathode electrodes; and
a catalyst layer arranged adjacent to the spacer, the catalyst layer being located on a side of the spacer opposite the cathode;
wherein a second array end of each carbon nanotube array is flush with a top end of the spacer nearest the gate electrodes; and an intermediate layer having a predetermined thickness is arranged between the gate electrodes and the catalyst layer.

7. The field emission display as described in claim 6, wherein each carbon nanotube array is connected to a corresponding cathode electrode via a layer of negative feedback resistance.

8. The field emission display as described in claim 6, wherein a material of the intermediate layer is selected from the group consisting of heatproof glass, metal coated with insulating material, silicon, silicon oxide, mica and ceramic material.

9. The field emission display as described in claim 8, wherein a thickness of the intermediate layer is in the range from 1 micron to 1000 microns.

10. The field emission display as described in claim 6, wherein a material of the spacer is selected from the group consisting of heatproof glass, metal coated with insulating material, silicon, silicon oxide, mica and ceramic material.

11. The field emission display as described in claim 6, wherein a height of the spacer is in the range from 1 micron to 10 mm.

12. The field emission display as described in claim 6, wherein a thin protective layer is arranged between the spacer and the intermediate layer.

13. The field emission display as described in claim 12, wherein a thickness of the thin protective layer is in the range from 10 nanometers to 1 micron.

14. The field emission display as described in claim 12, wherein a catalyst layer is arranged between the thin protective layer and the spacer.

15. The field emission display as described in claim 14, wherein a thickness of the catalyst layer is in the range from 1 nanometer to 10 nanometers.

16. A field emission display comprising:
a cathode assembly;
a carbon nanotube array having a first end in electrical connection with the cathode assembly and a second end which is substantially planar;
a support member ranged adjacent the second end of the carbon nanotube array;
a gate electrode positioned on the support member; and
a phosphor screen assembly having an anode electrode facing the carbon nanotube array;
wherein the support member comprises an insulative spacer, a catalyst layer, and an intermediate layer, the catalyst layer interposing the intermediate layer on a top of the insulative spacer, each of the spacer, the catalyst layer, and the intermediate layer having a predetermined thickness, and the second end of the carbon nanotube ray is flush with a top end of the spacer.

17. The field emission display as described in claim 16, wherein the thickness of the intermediate layer is in the range from 1 micron to 1000 microns.

18. The field emission display as described in claim 16, wherein the cathode assembly comprises a layer of negative feedback resistance.

19. The field emission display as described in claim 16, wherein a flatness of the carbon nanotube array is less than 1 micron.

20. The field emission display as described in claim 16, wherein the phosphor screen assembly comprises a phosphor layer.

21. The field emission display as described in claim 16, wherein the support member further comprises a protective layer between the catalyst layer and the intermediate layer.

22. The field emission display as described in claim 21, wherein a thickness of the protective layer is in the range from 10 nanometers to 1 micron.

* * * * *